United States Patent [19]

Neuzeret

[11] Patent Number: 5,080,122

[45] Date of Patent: Jan. 14, 1992

[54] NON-RETURN VALVE

[75] Inventor: Bernard Neuzeret, Fragnes, France

[73] Assignee: Socla, Cedex, France

[21] Appl. No.: 596,486

[22] Filed: Oct. 12, 1990

[30] Foreign Application Priority Data

Oct. 13, 1989 [FR] France ................. 89 13413

[51] Int. Cl.⁵ ............................................ F16K 15/06
[52] U.S. Cl. ..................... 137/15; 137/220; 137/328; 137/543.15; 137/584
[58] Field of Search .......... 137/220, 328, 533.27, 137/543.15, 584, 15

[56] References Cited

U.S. PATENT DOCUMENTS

| 620,676 | 3/1899 | Sanderson | 137/584 X |
|---|---|---|---|
| 862,714 | 8/1907 | Constantinov | 137/584 X |
| 1,003,819 | 9/1911 | Staples | 137/543.15 X |
| 1,470,018 | 10/1923 | Love . | |
| 1,861,420 | 5/1932 | Mahan | 137/543.15 X |
| 2,761,463 | 9/1956 | Wagner . | |
| 2,844,164 | 7/1958 | Robbins . | |
| 3,460,805 | 8/1969 | Kudlaty | 137/543.15 X |
| 4,893,654 | 1/1990 | Feuz | 137/328 X |

FOREIGN PATENT DOCUMENTS

| 269355 | 8/1912 | Fed. Rep. of Germany . | |
|---|---|---|---|
| 1044537 | 11/1958 | Fed. Rep. of Germany | 137/543.15 |
| 2462634 | 2/1981 | France . | |
| 473960 | 8/1952 | Italy | 137/543.15 |
| 912070 | 12/1962 | United Kingdom | 137/533.27 |

*Primary Examiner*—Robert G. Nilson
*Attorney, Agent, or Firm*—Remy J. VanOphem

[57] ABSTRACT

A valve body having an opening closed by a cover through which may be mounted or demounted a non-return obturator which is mobile along an upstream-downstream axis, the obturator being installed by first securing a first member to the valve body and then securing the obturator and its spring and then securing a second member.

14 Claims, 1 Drawing Sheet

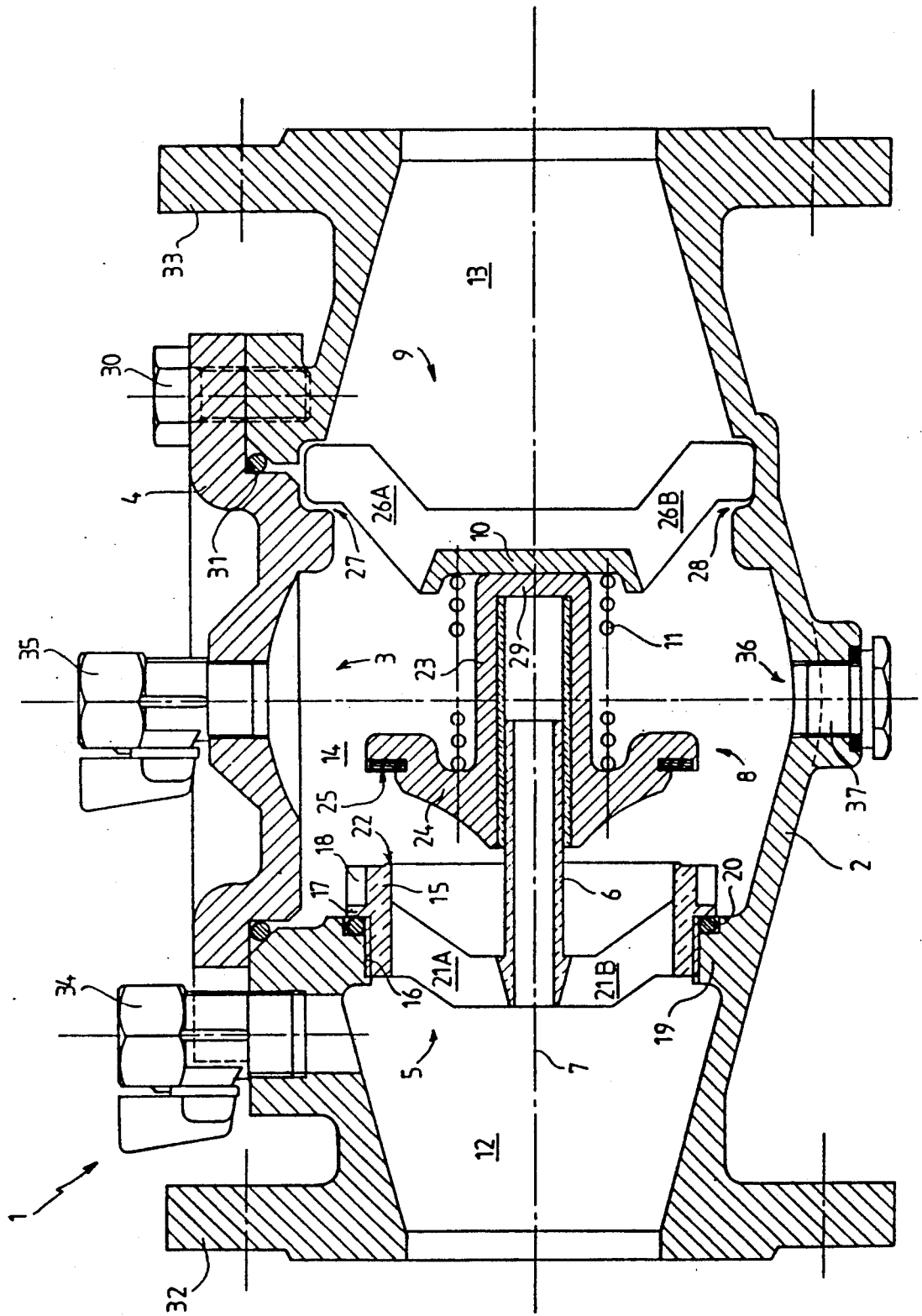

NON-RETURN VALVE

BACKGROUND OF THE INVENTION

1. FIELD OF THE INVENTION

The invention concerns a non-return valve which is constituted by a body provided with an opening closed by a cover through which a non-return obturator can be mounted or demounted.

2. DESCRIPTION OF THE PRIOR ART

Known valves of this kind are well thought of despite certain disadvantages as they allow repairs or maintenance to be carried out without the need to remove the valve as access is available to the obturator by a route other than via the connections between the valve and the pipes between which it is connected.

In a first known type of valve the obturator is a flap hinged near the cover with the result that these valves are easy to manufacture but offer only mediocre performance in terms of sealing and hydraulic characteristics.

In a second type of known valve, for example from the document FR-A-2427532, the obturator is fastened to a coaxial rod which cooperates with a guide fitted to the valve body. These valves offer satisfactory performance in terms of sealing but they introduce a significant head loss and require a relatively complex valve body which is costly to manufacture, because to enable fitting of the rod into the guide on the body through the cover the obturator must be mobile along an axis transverse or inclined to the upstream-downstream axis with which the valve connectors are coaxial, that is to say the main axis of the pipe into which the valve is inserted.

A valve with an obturator of this same type is also known except that it is movable along the upstream-downstream axis, which is made possible by the fact that the rod guide means are carried by the cover only. This entails inserting the obturator transversely through the opening and then pivoting the obturator-cover assembly to fit the cover to the opening at the same time the obturator is placed on the upstream-downstream axis. Because of this arrangement of the obturator the valve has good hydraulic characteristics but its performance in terms of sealing is mediocre.

The invention is directed to providing a valve of the same kind but which is easy to manufacture, has good hydraulic characteristics and offers good performance in teams of sealing.

SUMMARY OF THE INVENTION

The present invention is a valve including an obturator that is mobile along an upstream-downstream axis coaxial with the connectors of the valve. The obturator cooperates with mounting means which include a first member securable to the valve body including a rod for guiding sliding movement of the obturator; a second member securable to the valve body having a central wall; and a spring disposed between the obturator and the central wall which urges the obturator towards the first member.

The obturator and the mounting means are adapted to be fitted through the opening of the valve body by first securing the first member to the valve body and then securing the obturator and the spring and then the second member thereto.

The disposition of the obturator on the upstream-downstream axis provides the valve with good hydraulic characteristics while guiding of the obturator by a member fastened directly to the valve body permits very accurate positioning of the obturator relative to the valve seat. The valve according to the present invention, therefore, offers good performance in terms of sealing.

The valve of the present invention is also simple and economical, its component parts are easy to manufacture and its assembly is easy and convenient.

According to a preferred feature of the invention, the first member includes a ring joined to the guide rod by radial arms, with an end surface which forms a valve seat for the obturator.

It is advantageous that the valve seat not be formed directly by a part of the valve body, because this makes the body easier to manufacture and permits the valve seat to be changed if it deteriorates.

Also, the fact that the valve seat and the obturator guide are of unitary construction enables extremely accurate positioning of the obturator relative to the valve seat, which is beneficial from the point of view of the sealing effect.

According to other preferred features of the invention equally favorable in terms of sealing, and in particular to maintaining the sealing effect after prolonged use of the valve, the guide rod extends on each side of the plane containing the end surface forming the valve seat for the obturator, while the profile of the obturator and the length of the guide rod are such that the center of gravity of the obturator lies within the guide rod for any position of the obturator.

This permits the obturator to remain mobile along an axis perpendicular to the valve seat/obturator sealing plane regardless of how much the guides may be worn.

One embodiment of the invention will now be described by way of non-limiting illustrative example only, with reference to the appended drawing.

BRIEF DESCRIPTION OF THE DRAWING

FIG. 1 is a longitudinal cross-sectional view through a valve in accordance with the invention.

DETAILED DESCRIPTION OF THE PREFERRED EMBODIMENT

A non-return valve 1 as shown includes a body 2 having a lateral opening 3 which is closed by a cover 4. A first member 5 is affixed to the body 2 and includes a guide rod 6 which is coaxial with an upstream-downstream axis 7. An obturator 8 is fitted onto the guide rod 6 which guides the sliding movement of the obturator 8. A second member 9 is affixed to the body 2 and includes a central wall 10, and a spring 11 disposed between the obturator 8 and the central wall 10 which urges the obturator towards the first member 5.

The body 2 has a divergent upstream end 12 and a convergent downstream end 13 between which is a chamber 14 with the opening 3 at its top. The first member 5 is secured to the body 2 at the junction between the upstream end 12 and the chamber 14, and the second member 9 is secured to the junction of the chamber 14 and the downstream end 13.

The first member 5 includes a ring 15 whose exterior side surface carries a screwthread 16, a shoulder 17 and engagement member 18 for engaging a screwing tool. The screwthread 16 and the shoulder 17 cooperate with an annular boss 19 provided on the body 2 and the screwthreaded bore which cooperates with the screwthread 16, and whose side towards the chamber 14 includes a groove fitted with a seal 20 against which the shoulder 17 bears.

The ring 15 is joined to the guide rod 6 by radial arms 21A and 21B and inside the chamber 14 the end surface 22 of the ring 15 forms a valve seat for the obturator 8, with the guide rod 6 extending on both sides of a plane containing the end surface 22.

The obturator 8 has an elongate tubular portion 23, the bore of which cooperates with the guide rod 6. An obturator flange 24 is provided which merges the elongate tubular portion 23 at the end disposed towards the first member 5. The obturator flange 24 has a surface 25 which is adapted to come into contact with the end surface 22 of the ring 15 and serve as an abutment for the spring 11 which is disposed around the elongate tubular portion 23.

The second member 9 is secured to the body 2 by two radial arms 26A and 26B, the radial arm 26A being held in a notch 27 formed conjointly by the body 2 and the cover 4. The arm 26B is positioned in a notch 28 in the body 2.

The obturator 8 is mobile between the fully open position shown in the drawing, in which its end 29 is in contact with the central wall 10, and a closed position in which the contact surface 25 of the obturator flange 24 bears on the end surface 22 of the ring 15 which forms a valve seat.

The obturator adopts these positions subject to the same conditions as any non-return valve, that is it assumes the open position to allow fluid to flow in the upstream to downstream direction and the closed position to prevent flow in the reverse direction.

The profile of the obturator 8 and the length of the guide rod 6 are such that the center of gravity of the obturator lies inside the guide rod 6 for any position of the obturator, including the fully open position shown. This is favorable to the quality of the contact between the end surface 22 of the ring 15 and the surface 25 of the obturator flange 24 to effect sealing in the closed position, even after prolonged use has led to some wear of the guides.

As shown, the surface 25 of the obturator flange is on an annular seal attached to the upstream side of the obturator near its periphery.

The construction of the elongate portion 23 has the advantage of maximizing the lengths of the rod and the obturator which cooperate with each other while also providing central support for the spring 11.

The elongate tubular portion 23 is closed at the end 29 and the guide rod 6 is hollow, as shown. This has the advantage of minimizing the hydrodynamically useful surface area of the obturator which is lost due to the guide in the central part while avoiding slowing down the movement of the obturator from an open position to a closed position, the fluid in the bore of the elongate tubular portion 23 being evacuated without difficulty through the hollow guide rod 6. The radial arms 21A, 21B, 26A, and 26B and the obturator flange 24 have a hydrodynamic profile designed to minimize head losses.

The obturator 8, the first member 5, the second member 9 and the spring 11 are fitted through the opening 3, beginning by fixing the first member 5 to the valve body, and then fitting the obturator 8 and the spring 11, and then the second member 9.

The first member 5 is first screwed by hand into the threaded bore within the annular boss or flange portion 19 and then tool tightened with the engagement member 18 which is easily accessible at all times, including when the first member 5 is in the tightened position shown wherein the downstream surface of the first member 5 is in line with the edge of the opening 3.

The obturator is then inserted into the chamber 14 and because of the available space is easily fitted to the guide rod 6. A very similar operation fits the spring by one end over the elongate tubular portion 23 of the obturator, which is preferably placed against the first member 5 beforehand to facilitate this operation. The spring 11 is then compressed and the second member 9 inserted with an approximately vertical movement until the end of the arm 26B enters the notch 28 and the end of the arm 26A is lined up with the portion of the notch 27 on the body 2. When the spring 11 is released the end of the arm 26A enters the notch, if not already located there, and is held in place by the spring.

The cover 4 can then be fitted with no difficulty as there is no opposing spring force to impede this. When the cover is clamped onto the valve body the end of the arm 26A is locked in position by the notch 27.

It is, therefore, particularly easy and convenient to mount the first member 5, obturator 8, spring 11 and the second member 9 in the valve. The number of operations to be carried out is small and these operations require no particular skill. The only operations requiring the use of a tool are fitting the first member and the cover.

Alternately, instead of separately fitting the obturator 8 and then the spring 11, they may be fitted at the same time if the spring is fitted onto the obturator first.

In this case, the obturator and the spring can be separate parts or they can be fixed together to constitute an obturator-spring assembly, for example at the area of contact between the obturator flange 24 and the corresponding end of the spring.

Further, in some applications it may be advantageous to substitute two or more radial arms for the radial arm 26B.

The cover 4 is fixed to the body 2 by screws 30 and a gasket 31 is provided between the body and the cover to seal the valve.

The body 2 also includes an upstream connector 32 and a downstream connector 33 coaxial with the axis 7 for connecting the valve to the pipes between which it is designed to be inserted and pressure test points 34 and 35, respectively, in the wall of the upstream end 12 and in the cover 4 for testing the seal of the valve. A drain hole 36 closed by a plug 37 is provided at the bottom of the valve.

It is understood that the invention is not limited to the embodiment described and shown in the figure but to the contrary encompasses all variants thereof that might suggest themselves to those skilled in the art.

I claim:

1. A non-return valve comprising:
   a valve body having an upstream end, an oppositely disposed downstream end, and a chamber between said upstream end and said downstream end, said valve body further having a lateral opening into said chamber;
   a flange portion extending from said valve body between said upstream end and one end of said chamber;
   a first valve member removably mounted to said flange portion of said valve body within said chamber, said first valve member having a guide rod extending in a direction toward said downstream end, said first valve member being mounted to said flange portion through said lateral opening;

an obturator slidably disposed on said guide rod adjacent said first valve member, said obturator being mounted to said guide rod through said lateral opening;

a second member removably mounted to said valve body within said chamber adjacent said downstream end, said second member being mounted to said valve body through said lateral opening;

biasing means disposed between said obturator and said second member, said biasing means urging said obturator towards said first member, said biasing means being mounted between said obturator and said second member through said lateral opening; and closure means mounted to said valve body for closing said lateral opening of said valve body chamber whereby said first valve member, obturator, biasing means and second member are mounted in said chamber through said lateral opening such that said closure means provides access to said first valve member, obturator, biasing means and second member upon being dismounted from said lateral opening of said valve body.

2. A non-return valve according to claim 1 further comprising means for mounting said first valve member to said flange portion of said valve body, and means for mounting said second member in said chamber adjacent said downstream end.

3. A non-return valve according to claim 1 wherein said first valve member comprises a ring circumscribing said guide rod, a plurality of radial arms securing said ring to said guide rod and defining openings therebetween, and an end surface which forms a valve seat for cooperation with said obturator.

4. A non-return valve according to claim 3 wherein said ring has a circumferential surface having a screw thread thereon and a radially extending shoulder contiguous said screw thread having tool engagement means thereon, and wherein said flange portion further comprises a screw thread adapted to engage said screw thread of said ring.

5. A non-return valve according to claim 3 wherein said guide rod extends in said direction toward said downstream end beyond said end surface of said ring.

6. A non-return valve according to claim 1 wherein said obturator has a predetermined shape and said guide rod has a predetermined axial length such that said obturator has a center of gravity which remains located along said predetermined axial length of said guide rod for any axially displaced position of said obturator along said predetermined axial length.

7. A non-return valve according to claim 4 wherein said radially extending shoulder of said first valve member is an annular valve seat, and wherein said obturator further comprises:

an elongate tubular portion having a blind central bore which slidably receives said guide rod at a first end of said obturator; and a radial flange extending from said elongate tubular portion adjacent said first valve member, said radial flange having a contact surface adapted to cooperate with said valve seat on said end surface of said first valve member.

8. A non-return valve according to claim 7 wherein said obturator is axially slidable between an open position in which a second end of said obturator opposite said first end is in contact with said second member and a closed position in which said contact surface of said radial flange of said obturator bears on said valve seat on said end surface of said first valve member.

9. A non-return valve according to claim 7 wherein said guide rod of said first valve member is hollow.

10. A non-return valve according to claim 7 wherein said biasing means comprises a spring which circumscribes said elongate tubular portion of said obturator and bears against said radial flange to bias said obturator in a direction towards said upstream end.

11. A non-return valve according to claim 1 wherein said second member has radial arms mounted to said valve body, said radial arms defining openings therebetween.

12. A non-return valve according to claim 11 wherein said valve body further comprises an annular groove located between said chamber and said downstream end and further wherein each said radial arm of said second member has one end mounted in said annular groove formed in said valve body.

13. A method for disassembling a non-return valve having a valve body with a chamber disposed along a flow axis, an inlet to said chamber, an outlet to said chamber, a lateral opening into said chamber between said inlet and said outlet, an obturator slidably mounted on a guide rod coaxially disposed along said flow axis, and biasing means urging said obturator toward an upstream valve member located at said inlet while urging said obturator away from a downstream valve member located at said outlet, said method comprising the steps of:

removing a closure from said lateral opening;

removing said downstream valve member from a flange portion which extends from said valve body between said upstream end and said downstream end;

removing said downstream valve member from said chamber through said lateral opening;

removing said biasing means from said coaxially disposed guide rod;

removing said biasing means from said chamber through said lateral opening;

removing said obturator from said coaxially disposed guide rod;

removing said obturator from said chamber through said lateral opening; and removing said upstream valve member from said chamber through said lateral opening.

14. The method for disassembling a non-return valve according to claim 13 wherein said steps of removing said biasing means and said steps of removing said obturator are performed simultaneously, said biasing means and said obturator being removed together from said coaxially disposed guide rod and from said chamber as an assembly.

* * * * *